US008867116B1

(12) United States Patent
Kloeppner et al.

(10) Patent No.: US 8,867,116 B1
(45) Date of Patent: Oct. 21, 2014

(54) DISTATE ELECTROCHROMIC DEVICE

(71) Applicant: Gentex Corporation, Zeeland, MI (US)

(72) Inventors: Leroy J. Kloeppner, Jenison, MI (US);
Zachary J. Petroelje, Hudsonville, MI (US)

(73) Assignee: Gentex Corporation, Zeeland, MI (US)

( * ) Notice: Subject to any disclaimer, the term of this patent is extended or adjusted under 35 U.S.C. 154(b) by 40 days.

(21) Appl. No.: 13/836,656

(22) Filed: Mar. 15, 2013

(51) Int. Cl.
G02F 1/15 (2006.01)

(52) U.S. Cl.
CPC ........................................ G02F 1/15 (2013.01)
USPC ........................................................ 359/265

(58) Field of Classification Search
CPC ................................................... G02F 1/15
USPC .................................................. 359/265, 273
See application file for complete search history.

(56) References Cited

U.S. PATENT DOCUMENTS

| 4,297,401 | A | 10/1981 | Chern et al. |
| 4,340,624 | A | 7/1982 | Yamashita et al. |
| 4,418,102 | A | 11/1983 | Ferrato |
| 4,695,490 | A | 9/1987 | McClelland et al. |
| 4,902,108 | A | 2/1990 | Byker |
| 5,076,673 | A | 12/1991 | Lynam et al. |
| 5,122,647 | A | 6/1992 | Lynam et al. |
| 5,128,799 | A | 7/1992 | Byker |
| 5,202,787 | A | 4/1993 | Byker et al. |
| 5,204,778 | A | 4/1993 | Bechtel |
| 5,278,693 | A | 1/1994 | Theiste et al. |
| 5,280,380 | A | 1/1994 | Byker |
| 5,282,077 | A | 1/1994 | Byker |
| 5,294,376 | A | 3/1994 | Byker |
| 5,336,448 | A | 8/1994 | Byker |
| 5,434,407 | A | 7/1995 | Bauer et al. |
| 5,448,397 | A | 9/1995 | Tonar |
| 5,451,822 | A | 9/1995 | Bechtel et al. |
| 5,596,023 | A | 1/1997 | Tsubota et al. |
| 5,596,024 | A | 1/1997 | Horie et al. |
| 5,679,283 | A | 10/1997 | Tonar et al. |
| 5,751,467 | A | 5/1998 | Byker |
| 5,801,873 | A | 9/1998 | Byker |
| 5,808,778 | A | 9/1998 | Bauer et al. |
| 5,818,625 | A | 10/1998 | Forgette et al. |
| 5,888,431 | A | 3/1999 | Tonar et al. |
| 5,910,854 | A | 6/1999 | Varaprasad et al. |
| 5,928,572 | A | 7/1999 | Tonar et al. |
| 5,940,201 | A | 8/1999 | Ash et al. |

(Continued)

FOREIGN PATENT DOCUMENTS

| CA | 1300945 | 5/1992 |
| WO | PCT/US98/05570 | 3/1998 |

Primary Examiner — Joseph P Martinez
(74) Attorney, Agent, or Firm — Foley & Lardner LLP; Scott P. Ryan

(57) ABSTRACT

A distate interior electrochromic mirror including: first and second substrates; an electrochromic medium contained within a chamber positioned between the first and second substrates which includes at least one solvent, at least one anodic material, at least one cathodic material, wherein both of the anodic and cathodic materials are electroactive and at least one of the anodic and cathodic materials is electrochromic; a cross-linked polymer matrix; wherein, in a first state, the electrochromic medium exhibits a maximum light transmission; and wherein, in a second state, attenuation occurs to a significant extent in at least one of visible radiation and near-infrared radiation; and further wherein the distate electrochromic device does not materially exhibit segregation after being maintained in the second state for 24 continuous hours at 50 degrees centigrade.

20 Claims, 8 Drawing Sheets

(56) References Cited

U.S. PATENT DOCUMENTS

| | | |
|---|---|---|
| 5,998,617 A | 12/1999 | Srinivasa et al. |
| 6,002,511 A | 12/1999 | Varaprasad et al. |
| 6,016,215 A | 1/2000 | Byker |
| 6,020,987 A | 2/2000 | Baumann et al. |
| 6,037,471 A | 3/2000 | Srinivasa et al. |
| 6,064,509 A | 5/2000 | Tonar et al. |
| 6,137,620 A | 10/2000 | Guarr et al. |
| 6,141,137 A | 10/2000 | Byker et al. |
| 6,154,306 A | 11/2000 | Varaprasad et al. |
| 6,157,479 A | 12/2000 | Heuer et al. |
| 6,157,480 A | 12/2000 | Anderson et al. |
| 6,170,956 B1 | 1/2001 | Rumsey et al. |
| 6,175,441 B1 | 1/2001 | Heuer et al. |
| 6,183,878 B1 | 2/2001 | Berneth et al. |
| 6,188,505 B1 | 2/2001 | Lomprey et al. |
| 6,193,912 B1 | 2/2001 | Thieste et al. |
| 6,207,083 B1 | 3/2001 | Varaprasad et al. |
| 6,207,292 B1 | 3/2001 | Berneth et al. |
| 6,211,994 B1 | 4/2001 | Byker |
| 6,239,898 B1 | 5/2001 | Byker et al. |
| 6,241,916 B1 | 6/2001 | Claussen et al. |
| 6,242,602 B1 | 6/2001 | Giri et al. |
| 6,245,262 B1 | 6/2001 | Varaprasad et al. |
| 6,248,263 B1 | 6/2001 | Tonar et al. |
| 6,249,369 B1 | 6/2001 | Theiste et al. |
| 6,262,832 B1 | 7/2001 | Lomprey et al. |
| 6,277,307 B1 | 8/2001 | Berneth et al. |
| 6,323,988 B1 | 11/2001 | Heuer et al. |
| 6,327,070 B1 | 12/2001 | Heuer et al. |
| 6,351,328 B1 | 2/2002 | Byker |
| 6,356,376 B1 | 3/2002 | Tonar et al. |
| 6,359,274 B1 | 3/2002 | Nixon et al. |
| 6,372,159 B1 | 4/2002 | Berneth et al. |
| 6,379,013 B1 | 4/2002 | Bechtel et al. |
| 6,388,796 B1 | 5/2002 | Berneth et al. |
| 6,392,783 B1 | 5/2002 | Lomprey et al. |
| 6,402,328 B1 | 6/2002 | Bechtel et al. |
| 6,403,741 B1 | 6/2002 | Heuer et al. |
| 6,404,532 B1 | 6/2002 | Berneth et al. |
| 6,407,847 B1 | 6/2002 | Poll et al. |
| 6,417,951 B1 | 7/2002 | Berneth et al. |
| 6,420,036 B1 | 7/2002 | Varaprasad et al. |
| 6,433,914 B1 | 8/2002 | Lomprey et al. |
| 6,441,943 B1 | 8/2002 | Roberts et al. |
| 6,445,486 B1 | 9/2002 | Lomprey et al. |
| 6,452,711 B1 | 9/2002 | Heuer et al. |
| 6,466,355 B1 | 10/2002 | Berneth et al. |
| 6,471,360 B2 | 10/2002 | Rukavina et al. |
| 6,507,428 B1 | 1/2003 | Heuer et al. |
| 6,512,624 B2 | 1/2003 | Tonar et al. |
| 6,521,916 B2 | 2/2003 | Roberts et al. |
| 6,525,861 B1 | 2/2003 | Roberts et al. |
| 6,545,793 B2 | 4/2003 | Berneth et al. |
| 6,594,067 B2 | 7/2003 | Poll et al. |
| 6,597,489 B1 | 7/2003 | Guarr et al. |
| 6,600,589 B1 | 7/2003 | Berneth et al. |
| 6,606,184 B2 | 8/2003 | Guarr et al. |
| 6,614,578 B2 | 9/2003 | Giri et al. |
| 6,631,023 B1 | 10/2003 | Berneth et al. |
| 6,671,080 B2 | 12/2003 | Poll et al. |
| 6,700,692 B2 | 3/2004 | Tonar et al. |
| 6,700,693 B2 | 3/2004 | Roberts et al. |
| 6,710,906 B2 | 3/2004 | Guarr et al. |
| 6,714,334 B2 | 3/2004 | Tonar |
| 6,767,481 B2 | 7/2004 | Berneth et al. |
| 6,778,311 B2 | 8/2004 | Roberts et al. |
| 6,806,989 B2 | 10/2004 | Berneth |
| 6,842,276 B2 | 1/2005 | Poll et al. |
| 6,855,431 B2 | 2/2005 | Varaprasad et al. |
| 6,870,656 B2 | 3/2005 | Tonar et al. |
| 6,954,300 B2 | 10/2005 | Varaprasad et al. |
| 6,972,888 B2 | 12/2005 | Poll et al. |
| 7,009,751 B2 | 3/2006 | Tonar et al. |
| 7,031,044 B2 | 4/2006 | Roberts et al. |
| 7,042,616 B2 * | 5/2006 | Tonar et al. ............... 359/265 |
| 7,046,418 B2 | 5/2006 | Lin et al. |
| 7,064,882 B2 | 6/2006 | Tonar et al. |
| 7,085,609 B2 | 8/2006 | Bechtel et al. |
| 7,106,489 B2 | 9/2006 | Berneth et al. |
| 7,130,101 B2 | 10/2006 | Rukavina et al. |
| 7,154,657 B2 | 12/2006 | Poll et al. |
| 7,173,750 B2 | 2/2007 | Rukavina |
| 7,190,506 B1 | 3/2007 | Berneth et al. |
| 7,202,987 B2 | 4/2007 | Varaprasad et al. |
| 7,209,277 B2 | 4/2007 | Tonar et al. |
| 7,256,924 B2 | 8/2007 | Guarr et al. |
| 7,324,261 B2 | 1/2008 | Tonar et al. |
| 7,349,143 B2 | 3/2008 | Tonar et al. |
| 7,349,144 B2 | 3/2008 | Varaprasad et al. |
| 7,372,611 B2 | 5/2008 | Tonar et al. |
| 7,379,224 B2 | 5/2008 | Tonar et al. |
| 7,417,781 B2 | 8/2008 | Tonar et al. |
| 7,428,091 B2 | 9/2008 | Baumann et al. |
| 7,450,291 B2 | 11/2008 | Guarr et al. |
| 7,471,437 B2 | 12/2008 | Lenhard et al. |
| 7,511,872 B2 | 3/2009 | Tonar et al. |
| 7,525,714 B2 | 4/2009 | Poll et al. |
| 7,543,946 B2 | 6/2009 | Ockerse et al. |
| 7,589,883 B2 | 9/2009 | Varaprasad et al. |
| 7,612,929 B2 | 11/2009 | Tonar et al. |
| 7,643,200 B2 | 1/2010 | Varaprasad et al. |
| 7,688,495 B2 | 3/2010 | Tonar et al. |
| 7,746,534 B2 | 6/2010 | Tonar et al. |
| 7,821,696 B2 | 10/2010 | Tonar et al. |
| 7,821,697 B2 | 10/2010 | Varaprasad et al. |
| 7,855,821 B2 | 12/2010 | Baumann et al. |
| 7,864,400 B1 | 1/2011 | Cammenga et al. |
| 7,990,603 B2 | 8/2011 | Ash et al. |
| 8,164,817 B2 | 4/2012 | Varaprasad et al. |
| 8,169,681 B2 | 5/2012 | Tonar et al. |
| 8,169,684 B2 | 5/2012 | Bugno et al. |
| 8,264,761 B2 | 9/2012 | Cammenga et al. |
| 8,294,975 B2 | 10/2012 | Varaprasad et al. |
| 8,547,624 B2 | 10/2013 | Ash et al. |
| 8,559,092 B2 | 10/2013 | Bugno et al. |
| 8,559,093 B2 | 10/2013 | Varaprasad et al. |
| 2002/0015214 A1 | 2/2002 | Nishikitani et al. |
| 2006/0056003 A1 | 3/2006 | Tonar et al. |
| 2007/0201122 A1 | 8/2007 | Dozeman et al. |
| 2007/0206263 A1 | 9/2007 | Neuman et al. |
| 2008/0302657 A1 | 12/2008 | Luten et al. |
| 2009/0296190 A1 | 12/2009 | Anderson et al. |
| 2010/0073754 A1 | 3/2010 | Baumann |
| 2012/0229882 A1 | 9/2012 | Fish, Jr. et al. |

\* cited by examiner

US 8,867,116 B1

DISTATE ELECTROCHROMIC DEVICE

CROSS-REFERENCE TO RELATED APPLICATIONS

This application relates to U.S. Provisional Patent Application Ser. No. 61/783,371, filed Mar. 14, 2013, entitled "Dimmable Mirror Assembly and Method Thereof" which is hereby incorporated herein by reference in its entirety—including all references cited therein.

BACKGROUND OF THE INVENTION

1. Field of the Invention

The present invention relates in general to electrochromic devices and, more particularly, to distate electrochromic devices that are capable of being held in a low transmission state for extended periods of time without exhibiting segregation.

2. Background Art

The concept of distate electrochromic devices (e.g., interior electrochromic mirrors having a high transmission state and a singular low transmission state) has been known in the art. While such electrochromic devices are known in the art, limitations relative to maintaining color uniformity within the electrochromic medium remain problematic. As is shown in FIG. 1, when these electrochromic devices are maintained in their darkened or low transmission state for extended periods of time and/or at elevated temperatures, an optically undesirable phenomenon known in the art as segregation occurs.

It has now been surprisingly discovered that selective utilization of anodic and/or cathodic compounds within the electrochromic medium in combination with chamber configuration enables distate electrochromic devices to be maintained in their darkened or low transmission state for extended periods of time at elevated temperatures without materially exhibiting segregation.

It is therefore an object of the present invention, among other objects, to provide an electrochromic device (e.g., a vehicular interior electrochromic mirror) that is capable of being held in a low transmission state for extended periods of time without materially exhibiting segregation.

These and other objects of the present invention will become apparent in light of the present specification, claims, and appended drawings.

It will be understood that the file of this patent contains photographs and/or drawings executed in color on CD. Copies of this patent with color photographs and/or drawings will be provided by the Patent and Trademark Office upon request and payment of necessary fee.

SUMMARY OF THE INVENTION

The present invention is preferably directed to a distate interior electrochromic mirror comprising: (a) a first substantially transparent substrate having an electrically conductive material associated therewith; (b) a second substrate having an electrically conductive material and an at least partially reflective material associated therewith; (c) an electrochromic medium contained within a chamber positioned between the first and second substrates which comprises: (1) at least one solvent; (2) at least one anodic material; (3) at least one cathodic material, wherein both of the anodic and cathodic materials are electroactive and at least one of the anodic and cathodic materials is electrochromic; (4) a cross-linked polymer matrix, a free-standing gel, and/or a substantially non-weeping gel; (5) wherein, in a first state, the electrochromic medium exhibits a maximum light transmission; and (6) wherein, in a second state, attenuation occurs to a significant extent in at least one of visible radiation and near-infrared radiation; and (d) wherein the distate electrochromic device does not materially exhibit segregation after being maintained in the second state for 24 continuous hours at 50 degrees centigrade.

In a preferred embodiment of the present invention, in the second state, attenuation occurs to a significant extent in both visible radiation and near-infrared radiation.

In another preferred embodiment of the present invention, the distate interior electrochromic mirror does not materially exhibit segregation after being maintained in the second state for 48 continuous hours at 50 degrees centigrade.

In yet another preferred embodiment of the present invention, the anodic material comprises a substituted phenazine and/or the cathodic material comprises a viologen. In this embodiment the concentration of the anodic material and the cathodic material each ranges from approximately 1 mM to approximately 500 mM.

In another aspect of the present invention, the electrochromic medium further comprises anodic and/or cathodic color-stabilizing redox buffers.

In another preferred embodiment of the present invention, the chamber comprises a thickness of at least one of approximately 150 microns, 160 microns, 170 microns, and 180 microns.

In another aspect of the present invention, the conductivity of the electrically conductive material associated with the first and/or second substrates is preferably less than 40 ohms/square, more preferably less than 15 ohms/square, yet more preferably less than 10 ohms/square, and are even more preferably less than 2 ohms/square.

The present invention is also preferably directed to an interior electrochromic mirror comprising: (a) a front element having first and second surfaces; (b) a rear element having third and fourth surfaces; (c) wherein the front and rear elements are sealably bonded together in a spaced-apart relationship to define a chamber having dimensions such that the width is longer than the height and such that the second surface and the third surface face one another; (d) a substantially transparent first electrode including a layer of conductive material associated with the second surface and a second electrode including an at least partially reflective material associated with the third surface; (e) an electrochromic medium contained in the chamber and first and second electrical contacts electrically communicating with a respective one of the first and second electrodes; (f) wherein the electrochromic mirror is adapted to be in one of a high transmission state and a low transmission state; and (g) wherein after being maintained in its low transmission state for 24 continuous hours at 50 degrees centigrade, and wherein after the first and second electrodes are shorted to one another, the reflectance of the electrochromic mirror rises above approximately 50 percent of its maximum reflectance in less than 20 seconds, the measurement being taken approximately one centimeter away from the edge where the cathode is connected to the power source of the electrochromic mirror and at the midpoint of the elongated side.

In a preferred embodiment of the present invention, the reflectance of the mirror rises above approximately 75 and/or 90 percent of its maximum reflectance in less than 10 and/or 20 seconds.

The present invention is likewise preferably directed to an interior electrochromic mirror comprising: (a) a front element having first and second surfaces; (b) a rear element having third and fourth surfaces; (c) wherein the front and rear elements are sealably bonded together in a spaced-apart relationship to define a chamber having dimensions such that the width is longer than the height, the thickness greater than approximately 145 microns, and such that the second surface and the third surface face one another; (d) a substantially transparent first electrode including a layer of conductive material associated with the second surface and a second electrode including a partially reflective material associated with the third surface; (e) an electrochromic medium contained in the chamber and first and second electrical contacts electrically communicating with a respective one of the first and second electrodes; (f) wherein the electrochromic mirror is adapted to be in one of a high transmission state and a low transmission state; and (g) wherein after being maintained in its low transmission state for 24 continuous hours at 50 degrees centigrade, and wherein after the first and second electrodes are shorted to one another, the reflectance of the electrochromic mirror rises above approximately 50 percent of its maximum reflectance in less than 20 seconds, the measurement being taken approximately one centimeter away from the edge where the cathode is connected to the power source of the electrochromic mirror and at the midpoint of the elongated side.

These and other features, advantages, and objects of the present invention will be further understood and appreciated by those skilled in the art by reference to the following specification, claims, and appended drawings.

BRIEF DESCRIPTION OF THE DRAWINGS

Certain embodiments of the present invention are illustrated by the accompanying figures. It will be understood that the figures are not to scale and that details not necessary for an understanding of the invention or that render other details difficult to perceive have been omitted for clarity. It will be further understood that the invention is not necessarily limited to the particular embodiments illustrated herein.

The invention will now be described with reference to the drawings wherein.

DETAILED DESCRIPTION OF THE INVENTION

Figure 2:
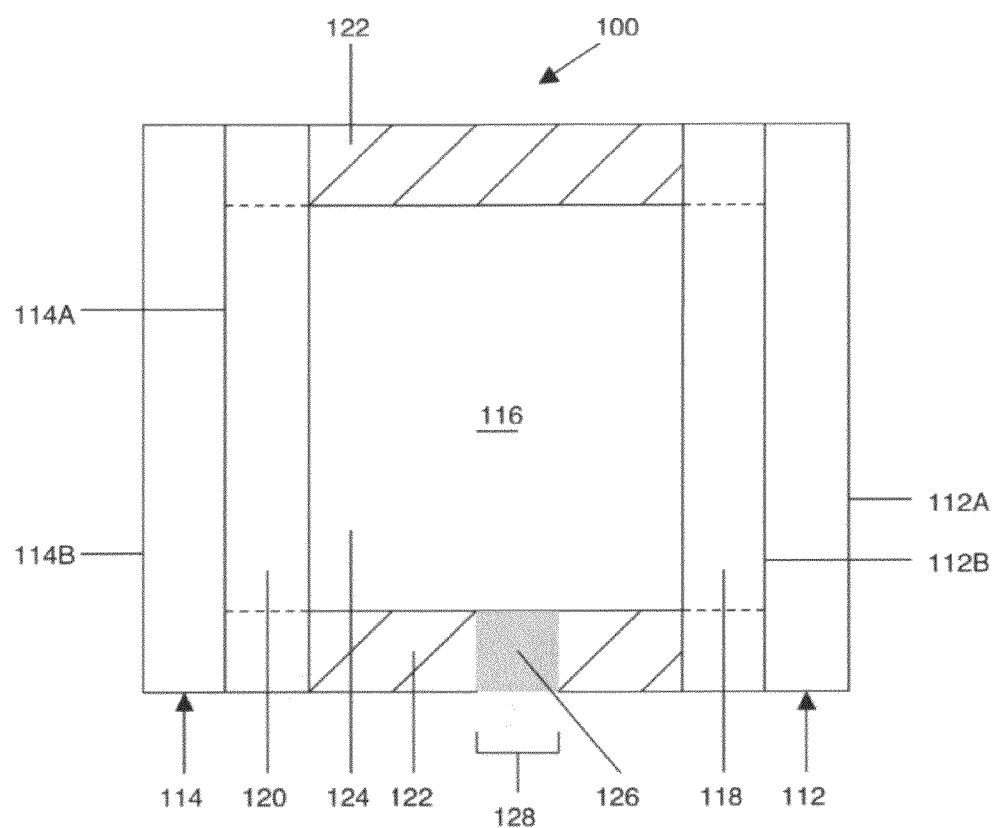
FIG. 2 of the drawings is a cross-sectional schematic representation of an electrochromic device fabricated in accordance with the present invention.
Figure 3:
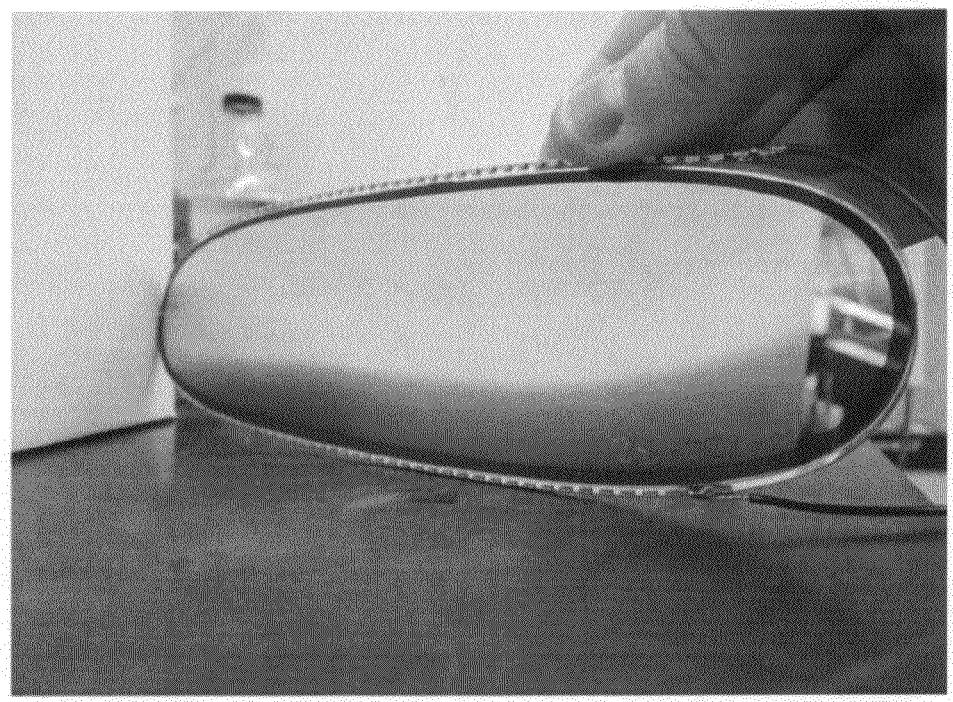
FIG. 3 of the drawings is a color photograph of an electrochromic device fabricated in accordance with Example II showing the phenomenon known as segregation.
Figure 4:
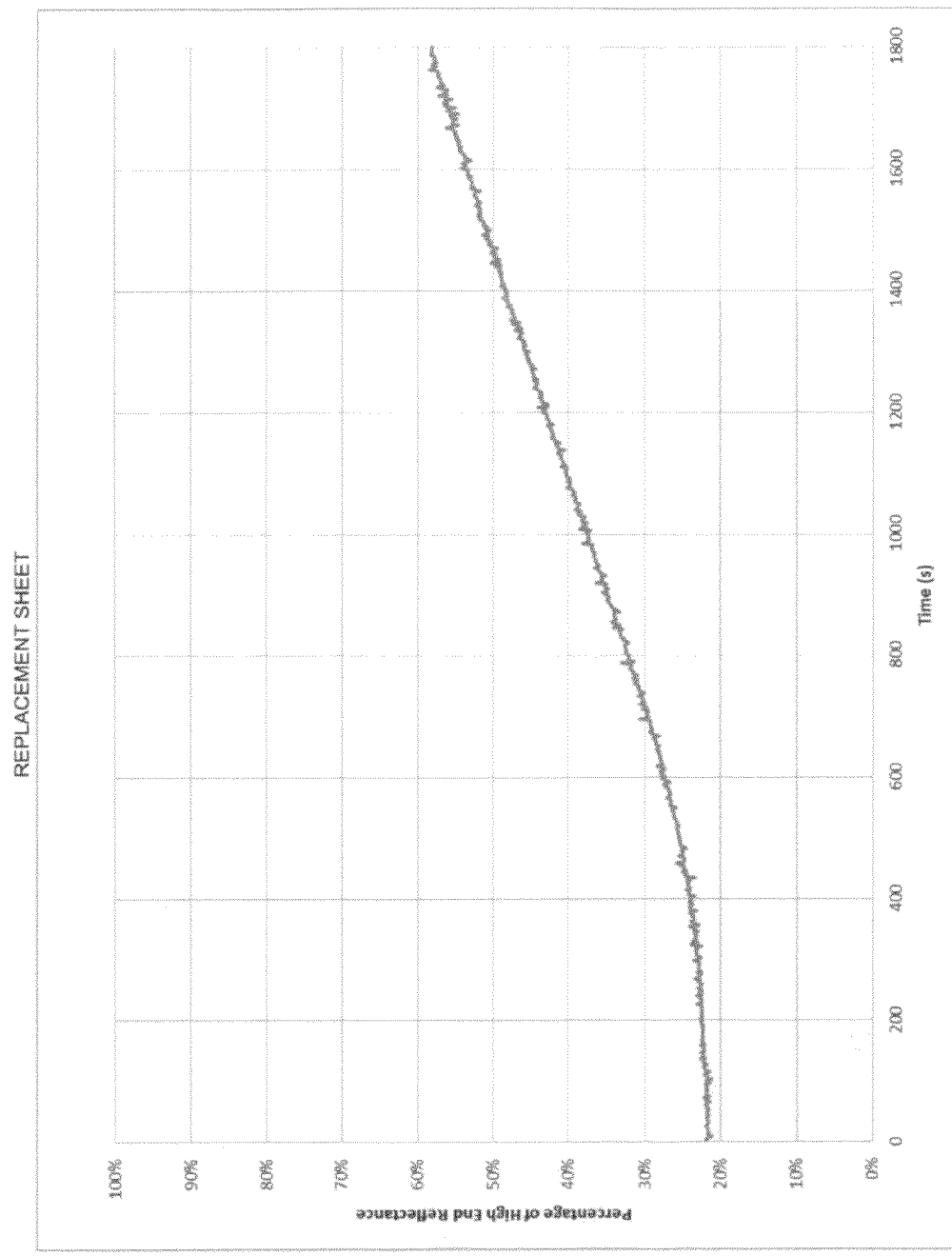
FIG. 4 of the drawings is a two-dimensional plot showing the change in percentage of high end reflectance as a function of time for Example II.
Figure 5:
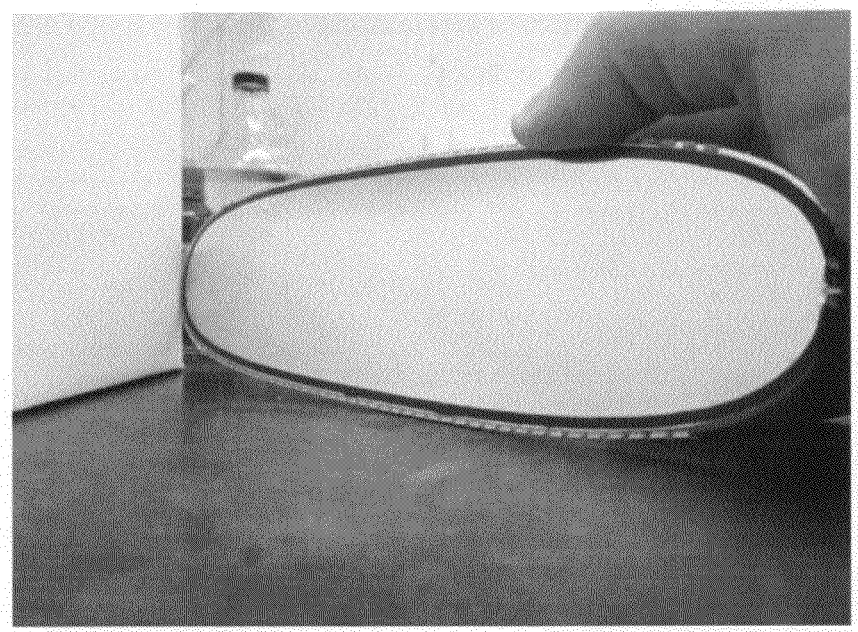
FIG. 5 of the drawings is a color photograph of an electrochromic device fabricated in accordance with Example III.
Figure 6:
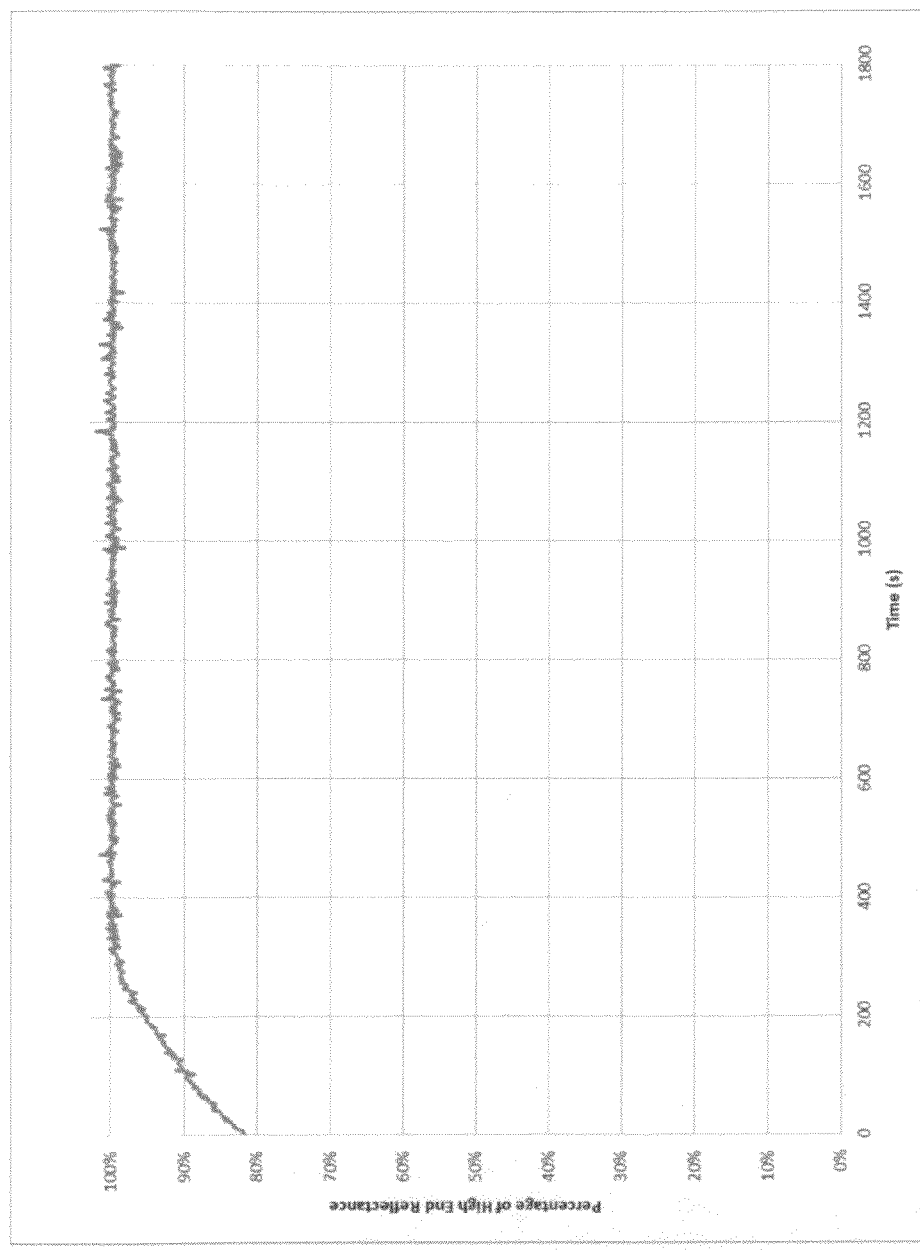
FIG. 6 of the drawings is a two-dimensional plot showing the change in percentage of high end reflectance as a function of time for Example III.

Referring now to the drawings and to FIG. 2 in particular, a cross-sectional schematic representation of electrochromic device 100 is shown, which generally comprises first substrate 112 having front surface 112A and rear surface 112B, second substrate 114 having front surface 114A and rear surface 114B, chamber 116 for containing electrochromic medium 124, and one or more plugs 126 associated with one or more fill ports 128. In accordance with the present invention, electrochromic device 100 may comprise, for illustrative purposes only, an interior electrochromic mirror for a vehicle which consists of two states, namely: (1) an off state—also known as a zero potential, high transmission, and/or non-darkened state; and (2) an on state—also known as an applied potential, low transmission, and/or fully darkened state. It will be understood that like or analogous elements and/or components, and/or methods referred to herein, may be identified throughout the drawings with like reference characters. It will be further understood that FIG. 2 is merely a schematic representation of electrochromic device 100. As such, some of the components have been distorted from their actual scale for pictorial clarity. Indeed, numerous other electrochromic device components and/or subcomponents are contemplated for use, including those disclosed in U.S. Pat. No. 6,597,489 entitled "Electrode Design For Electrochromic Devices," U.S. Pat. No. 6,433,914 entitled "Color-Stabilized Electrochromic Devices," U.S. Pat. No. 6,407,847 entitled "Electrochromic Medium Having A Color Stability," U.S. Pat. No. 6,239,898 entitled "Electrochromic Structures," U.S. Pat. No. 6,137,620 entitled "Electrochromic Media With Concentration-Enhanced Stability, Process For The Preparation Thereof And Use In Electrochromic Devices," U.S. Pat. No. 5,940,201 entitled "Electrochromic Mirror With Two Thin Glass Elements And A Gelled Electrochromic Medium," and U.S. Patent Application Publication No. 2006/0056003 entitled "Vehicular Rearview Mirror Elements And Assemblies Incorporating These Elements,"—all of which are hereby incorporated herein by reference in their entirety including all references incorporated and/or cited therein.

First substrate 112 may be fabricated from any one of a number of materials that are transparent or substantially transparent in the visible region of the electromagnetic spectrum, such as, for example, borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as Topas®, which is commercially available from Ticona of Summit, N.J. First substrate 112 is preferably fabricated from a sheet of glass having a thickness ranging from approximately 0.10 millimeters (mm) to approximately 12.7 mm, and more preferably from approximately 0.50 mm to approximately 2.50 mm, and yet more preferably from approximately 1.60 mm to approximately 2.20 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun. It will be further understood that first substrate 112 and/or second substrate 114 may comprise a UV absorbing layer and/or contain a UV absorbing material to help protect the substrate(s) and/or the electrochromic media from UV damage.

Second substrate 114 may be fabricated from similar materials as that of first substrate 112. Second substrate 114 is preferably fabricated from a sheet of glass or plastic having a thickness ranging from approximately 0.10 millimeters (mm) to approximately 12.7 mm, and more preferably from approximately 0.50 mm to approximately 2.50 mm, and yet more preferably from approximately 1.60 mm to approximately 2.20 mm. If first and second substrates 112 and 114, respectively, are fabricated from sheets of glass, then the glass can optionally be tempered, heat strengthened, chemically strengthened, and/or laminated prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a seal member; (d) is generally resistant to corrosion from materials contained within the electrochromic device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide, indium zinc oxide, metal oxide/metal/metal oxide (wherein metal oxide can be substituted with metal carbide, metal nitride, metal sulfide, etcetera), or other materials known to those having ordinary skill in the art.

Electrically conductive material 120 is preferably associated with front surface 114A of second substrate 114, and is preferably operatively bonded to electrically conductive material 118 by seal member 122. As can be seen in FIG. 2, once bonded, seal member 122, plug 126 and/or the juxtaposed portions of electrically conductive materials 118 and 120 serve to generally define an inner peripheral geometry of chamber 116.

In accordance with one embodiment of the present invention, the conductivity or sheet resistance of one or both coatings of 118 and 120 are preferably less than 40 ohms/square, more preferably less than 15 ohms/square, yet more preferably less than 10 ohms/square, and are even more preferably less than 2 ohms/square.

In certain embodiments of the present invention, the thickness or cell spacing of chamber 116 preferably ranges from approximately 150 microns to approximately 200 microns, and more preferably ranges from approximately 150 microns to approximately 180 microns. Examples of preferred cell spacings include, but are not limited to, 150 microns, 155 microns, 160 microns, 165 microns, 170 microns, 175 microns, 180 microns, 185 microns, 190 microns, 195 microns, and 200 microns.

It will be understood that alternative edge sealing techniques may be utilized which are disclosed in U.S. Pat. No. 7,372,611 entitled "Vehicular Rearview Mirror Elements And Assemblies Incorporating These Elements," and U.S. Patent Publication No. 2012/0229882 entitled "Rearview Assembly for a Vehicle," which are hereby incorporated herein by reference in their entirety including all references incorporated and/or cited therein.

Seal member 122 may comprise any material that is capable of being adhesively bonded to the electrically conductive materials 118 and 120 to, in turn, seal chamber 116, (in certain embodiments in cooperation with plug 126 and fill port 128, see FIG. 2) so that electrochromic medium 124 does not inadvertently leak out of the chamber. As is shown in dashed lines in FIG. 2, it is also contemplated that the seal member extend all the way to rear surface 112B and front surface 114A of their respective substrates. In such an embodiment, the layers of electrically conductive material 118 and 120 may be partially removed where the seal member 122 is positioned. If electrically conductive materials 118 and 120 are not associated with their respective substrates, then seal member 122 preferably bonds well to glass. It will be understood that seal member 122 can be fabricated from any one of a number of materials including, for example, those disclosed in U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," U.S. Pat. No. 6,157,480 entitled "Seal For Electrochromic Devices," and U.S. Pat. No. 6,714,334 entitled "Electrochromic Device Having A Seal Including An Epoxy Resin Cured With A Cycloaliphatic Amine," all of which are hereby incorporated herein by reference in their entirety including all references incorporated and/or cited therein.

For purposes of the present disclosure, and as will be explained in greater detail herein below, electrochromic medium 124 typically comprises at least one solvent, at least one anodic material (e.g., 1, 2, 3, etc.), and at least one cathodic material (e.g., 1, 2, 3, etc.).

Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably single-layer, single-phase, wherein the electrochromic medium may comprise a single-layer of material which may include small non-homogenous regions and includes solution-phase devices where a material may be contained in solution in an ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Patent Publication No. 2002/0015214 A1 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," which is hereby incorporated herein by reference in its entirety including all references incorporated and/or cited therein.

In addition, electrochromic medium 124 may comprise other materials, such as light absorbers, light stabilizers, thermal stabilizers, antioxidants, thickeners, viscosity modifiers, tint providing agents, redox buffers, and mixtures thereof. Suitable redox buffers include, among others, those disclosed in U.S. Pat. No. 6,188,505 B1 entitled "Color-Stabilized Electrochromic Devices," which is hereby incorporated herein by reference in its entirety—including all continuing applications/patents claiming priority therefrom. Suitable UV-stabilizers may include: the material 2-ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

For purposes of the present invention, anodic materials may include any one of a number of materials including ferrocene, substituted ferrocenes, substituted ferrocenyl salts, phenazine, substituted phenazines, phenothiazine, substituted phenothiazines including substituted dithiazines, thianthrene, and substituted thianthrenes. Examples of anodic materials may include di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP)—see U.S. Pat. No. 6,242,602 B1 for synthesis, which is hereby incorporated herein by reference in its entirety, and bis(butyltriethylammonium)-para-methoxytriphenodithiazine (TPDT)—see synthesis of 3,10-dimethoxy-7,14-(triethylammoniumbutyl)-triphenodithiazinebis(tetrafluoroborate) in U.S. Pat. No. 6,710,906 B2, which is hereby incorporated herein by reference in its entirety. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 B1 entitled "Color-Stabilized Electrochromic Devices," U.S. Pat. No. 6,710,906 B2 entitled "Controlled Diffusion Coefficient Electrochromic Materials For Use In Electrochromic Mediums And Associated Electrochromic Devices," and U.S. Pat. No. 7,428,091 B2 entitled "Electrochromic Compounds and Associated Media and Devices," all of which are hereby incorporated herein by reference in their entirety including all references incorporated and/or cited therein.

Cathodic materials may include, for example, viologens, such as methyl viologen tetrafluoroborate, octyl viologen tetrafluoroborate (octylviologen), or benzyl viologen tetrafluoroborate, ferrocinium salts, such as (6-(tri-tert-butylferrocinium)hexyl)triethylammonium di-tetrafluoroborate (TT-BFc$^+$)—see U.S. Pat. No. 7,046,418 entitled "Reversible Electrodeposition Devices And Associated Electrochemical Media" for synthesis which is hereby incorporated herein by reference in its entirety. It will be understood that the preparation and/or commercial availability for each of the above-identified cathodic materials is well known in the art. See, for example, "The Bipyridinium Herbicides" by L.A. Summers (Academic Press 1980). While specific cathodic materials have been provided for illustrative purposes only, numerous other conventional cathodic materials are likewise contemplated for use including, but by no means limited to, those disclosed in previously referenced U.S. Pat. No. 4,902,108, U.S. Pat. No. 6,188,505, U.S. Pat. No. 6,710,906 B2, as well as U.S. Pat. No. 7,855,821 B2 entitled "Electrochromic Compounds and Associated Media and Devices," all of which are hereby incorporated herein by reference in their entirety including all references incorporated and/or cited therein.

For illustrative purposes only, the concentration of the anodic and/or cathodic materials can range from approximately 1 millimolar (mM) to approximately 500 mM and more preferably from approximately 2 mM to approximately 100 mM.

For purposes of the present disclosure, a solvent of electrochromic medium 124 may comprise any one of a number of common, commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

In one aspect of the present invention plug 126 is associated with fill port 128, which preferably comprises an epoxy resin or mixture of resins (or other resins provided herein) and which is at least partially cured with a cationic photoinitiating antimonate salt and/or comprises an antimonate toward enhancing durability of plug 126 and/or compatibility of the same with electrochromic medium 124 and/or external atmospheric conditions. Such enhanced durability and/or compatibility preferably reduces the likelihood of any materials within electrochromic medium 124 being compositionally compromised and/or from inadvertently leaking out of chamber 116 through fill port 128.

It will be understood that during normal fabrication of electrochromic device 100, fill port 128 is utilized to introduce electrochromic medium 124 into chamber 116 of electrochromic device 100. In certain embodiments (e.g., FIG. 2) partially fabricated electrochromic device 100 is placed with fill port 128 downward in an empty container or trough in a vacuum vessel and evacuated. Electrochromic medium 124 is introduced into the trough or container in a manner such that fill port 128 is submerged. The vacuum vessel is then backfilled, which forces electrochromic medium 124 through fill port 128 and, ultimately, into chamber 116. In certain other embodiments, partially fabricated electrochromic device 100 is placed with fill port 128 upward in a vacuum vessel and evacuated. Electrochromic medium 124 is introduced into the container via conventional conduit. Additional discussions relative to the fabrication process of certain embodiments of electrochromic devices 100 are disclosed in U.S. Pat. No. 6,700,692 B2, which has been previously referenced and incorporated herein.

The formulation of plug 126 may also comprise an epoxy resin or mixture of resins (e.g. cycloaliphatic epoxy resins including, for example, Omnilane OC1005, which is available from IGM Resins Inc., Bartlett, Ill., aromatic epoxy resins including, for example, Bis-F, Bis-A, and/or epoxy novolac resins including, for example, DER 354, DER 332, and DEN 431, which are all available from the Dow Chemical Company—all of which may be optionally filled with fumed silica or other fillers such as glass beads, calcium carbonate, aluminum oxide, calcium fluoride, or other fillers as desired) which are at least partially cured using one or more antimonate photo initiators, such as, for example, a sulfonium antimonate, an arylsulfonium antimonate, a triarylsulfonium antimonate, a triarylsulfonium hexafluoroantimonate, and a mixed triarylsulfonium hexafluoroantimonate, and combinations thereof.

While specific anionic salts of photo initiators have been disclosed, for illustrative purposes only, it will be understood that any one of a number of other anions are contemplated for use in accordance with the present invention, including, for example, $AsF_6$, $Ga(C_6F_6)_4$, etcetera.

The formulation of plug 126 may also comprise a resin or mixture of resins (e.g., epoxy resins, such as epoxidized polybutadienes, epoxidized castor oil, epoxidized cashew nut oil, acrylated butadiene resins, among other provided herein) that are substantially insoluble and/or substantially immiscible with an associated electrochromic medium (i.e., 124) while in the uncured state. By way of supporting example, the resin or mixture of resins may comprise Sartomer CN-301, Sartomer CN-304, Rhan BR-643.

For purposes of the present invention it will be understood that resins other than acrylated (Sartomer CN-301), methacrylated (Sartomer CN-304) or epoxidized polybutabiene can be used in a plug formulation that are at least substantially insoluble and/or at least substantially immiscible in the EC media. Other insoluble monomers or oligomers available from Sartomer include CN-986 (aliphatic urethane acrylate), CN-2252 (polyester acrylate), CN-934 (aliphatic urethane acrylate), CN-975 (hexafunctional urethane acrylate), CN-965 (aliphatic urethane acrylate), CN-981 (aliphatic urethane acrylate) CN-973 (aromatic urethane acrylate), SR-489 (tridecyl acrylate) and SR-335 (lauryl acrylate)—just to name a few.

Plug 126 may also comprise two-parts, namely; a first sub-component comprising a resin or mixture of resins (e.g., epoxy resins, acrylated butadiene resins, among other provided supra and infra) that are substantially insoluble and/or substantially immiscible with an associated electrochromic medium (i.e., 124) while in the uncured state, and a second-subcomponent comprising a resin or mixture of resins (e.g., epoxy resins, urethane resins, phenolic resins, acrylic resins, cured at room temperature, thermally and/or with radiation, among other provided supra and infra) that exhibit desired permeability, adhesion, and/or stability characteristics. In particular, the permeability of the second-subcomponent will preferably protect electrochromic medium 124 from air and/or moisture if the first-subcomponents exhibit permeability to air and/or moisture. Furthermore, the second-subcomponent will preferably adhere to at least the first-subcomponent toward maintaining device integrity over long periods of time—including one or more decades depending upon the application of the particular electrochromic device.

Additional non-limiting examples of resins that are suitable for use as second-subcomponent resins and/or resins cured with an antimonate photo initiator include conventional aliphatic amines, cycloaliphatic amines, amidoamines, mercaptans, cycloaliphatic epoxy resins such as Omnilane OC1005, which is available from IGM Resins Inc., Bartlett, Ill., aromatic epoxy resins such as Bis-F, Bis-A, and/or epoxy novolac resins such as DER 354, DER 332, and DEN 431, which are all available from the Dow Chemical Company, as well as thermal and/or photo-initiators, and optionally filled with fumed silica or other fillers such as glass beads, calcium carbonate, aluminum oxide, etcetera, using conventional techniques.

Electrochromic device 100 further includes a means of providing electrical contact to the electrochromic medium, such as bus clips (not shown) that can be clipped about the perimeter of first and second elements 112 and 114 in such a manner as to physically and electrically contact electrodes 118 and 120 as is disclosed in U.S. Pat. No. 6,407,847, entitled "Electrochromic Medium having a Color Stability," and U.S. Pat. No. 6,064,509, entitled "Clip for Use With Transparent Conductive Electrodes in Electrochromic Devices," the disclosures of which are hereby incorporated herein by reference in their entirety.

In accordance with the present invention, a distate interior electrochromic mirror is provided which comprises: a first substantially transparent substrate having an electrically conductive material associated therewith; a second substrate having an electrically conductive material and an at least partially reflective material associated therewith; an electrochromic medium contained within a chamber positioned between the first and second substrates which comprises: at least one solvent; at least one anodic material; at least one cathodic material, wherein both of the anodic and cathodic materials are electroactive and at least one of the anodic and cathodic materials is electrochromic; a cross-linked polymer matrix; wherein, in a first state, the electrochromic medium exhibits a maximum light transmission; and wherein, in a second state, attenuation occurs to a significant extent in visible radiation and/or near-infrared radiation; and wherein the distate electrochromic device does not materially exhibit segregation after being maintained in the second state for 24 continuous hours at 50 degrees centigrade, and more preferably for 48 continuous hours at 50 degrees centigrade.

In further accordance with the present invention, an interior electrochromic mirror is provided which comprises: a front element having first and second surfaces; a rear element having third and fourth surfaces; wherein the front and rear elements are sealably bonded together in a spaced-apart relationship to define a chamber having dimensions such that the width is longer than the height, the thickness greater than approximately 150 microns, and such that the second surface and the third surface face one another; a substantially transparent first electrode including a layer of conductive material associated with the second surface and a second electrode including an at least partially reflective material associated with the third surface; an electrochromic medium contained in the chamber and first and second electrical contacts electrically communicating with a respective one of the first and second electrodes; wherein the electrochromic mirror is adapted to be in one of a high transmission state and a low transmission state; and wherein after being maintained in its low transmission state for 24 continuous hours at 50 degrees centigrade, and wherein after the first and second electrodes are shorted to one another, the reflectance of the electrochromic mirror rises above approximately 50 percent of its maximum reflectance in less than 20 seconds, the measurement being taken approximately one centimeter away from the edge where the cathode is connected to the power source of the electrochromic mirror and at the midpoint of the elongated side. Preferably the reflectance of the mirror rises above approximately 75 percent of its maximum reflectance in less than 20 seconds, and more preferably the reflectance of the mirror rises above approximately 90 percent of its maximum reflectance in less than 20 seconds, and yet more preferably the reflectance of the mirror rises above approximately 90 percent of its maximum reflectance in less than 10 seconds.

It will be understood that, unless otherwise specified, the chemical reagents and compounds provided herein below, or their precursors, are available from common commercial chemical vendors, such as Sigma-Aldrich Chemical Co., of St. Louis, Mo.

The invention is further described by the following examples.

Example I

Figure 1:
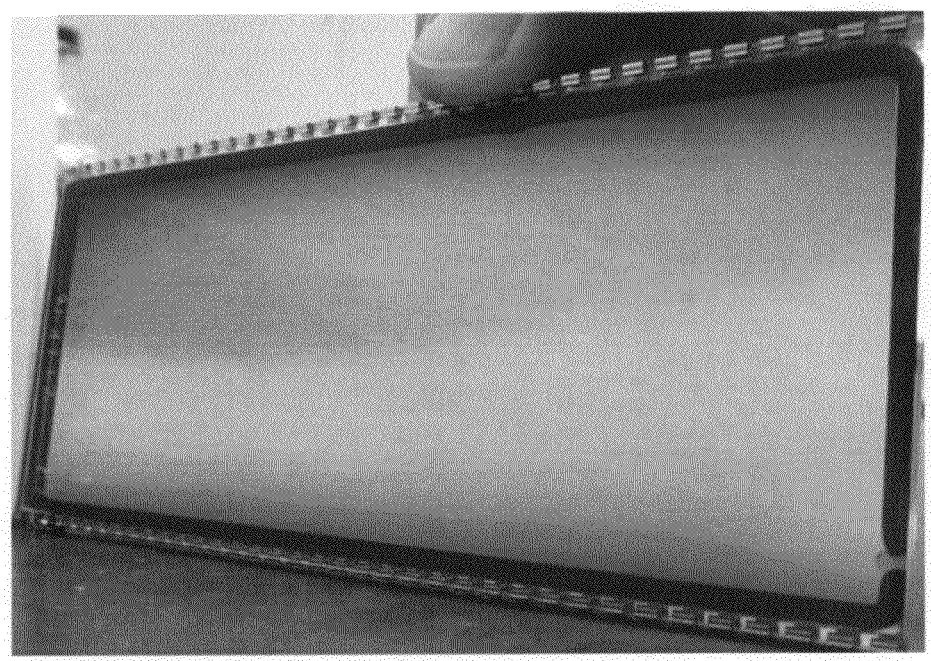
FIG. 1 of the drawings is a color photograph of a prior art electrochromic device showing the phenomenon known as segregation.

An electrochromic device was fabricated by taking two sheets (6.5 cm×14.5 cm) of indium-doped tin oxide (ITO) coated on 2.2 mm thick glass. The two ITO surfaces were facing one another and spaced apart by 0.0137 cm. One of the sheets of ITO was also coated on the opposite side with a metal reflector, making this device a mirror. The 0.0137 cm spacing was achieved by mixing glass bead spacers in an epoxy seal material that was dispensed on the outside perimeter of the device, with a small gap in the seal material about 2 mm in one end of the device. Once the electrochromic fluid was backfilled into this device through this gap, the gap was closed and sealed with a UV-cured epoxy. The two sheets of ITO were slightly offset along the 14.5 cm edge to allow the addition of a metal bus-bar to attach to electrical contacts. The inner dimensions of this device were 5.8 cm×13.9 cm×0.0137 cm. This device was filled and sealed with a solution of 20 mM 1,1'-dibenzyl-4,4'-bipyridinium difluoroborate, 20 mM 5,10-dihydro-5,10-dimethylphenazine, and 100 mM tetra-n-butylammonium fluoroborate in propylene carbonate. The device was powered for 24 hours at room temperature (about 20° C.) and 1.0 volt in the vertical orientation, with the 6.5 cm side perpendicular to the earth and the 14.5 cm side parallel to the earth. The front piece of ITO coated glass (without the mirror coating) had the bus-bar attach to the top edge of the mirror and was the device's anodic electrode. The back piece of ITO coated glass (with the mirror coating on the back side) had the bus-bar attached to the bottom edge of the mirror and was the device's cathodic electrode. After 24 hours at 1.0 volts, the device was removed from the power supply and the two leads to the device were shorted. After waiting 10 seconds for the device to clear, considerable amounts of segregation were observed in this device. The segregation appears as a blue band at the top of the device and a green band at the bottom of the device. See FIG. 1. It took more 50 minutes for this segregation to completely clear while remaining in the vertical position.

Examples II-IV

Three electrochromic devices were fabricated in a manner similar to experiment I. In these experiments three different cell spacings were used. The first device (experiment II) included a cell spacing of approximately 135 µm, the second device (experiment III) included a cell spacing of approximately 145 µm, and the third device (experiment IV) included a cell spacing of approximately 165 µm. The electrochromic mediums contained propylene carbonate, cathodic viologens, anodic phenazines, anodic and cathodic redox buffers, a UV stabilizer, and a cross-linked polymer matrix in accordance with the disclosure set forth herein pertaining to electrochromic medium 124. It will be understood that the anodic and cathodic concentrations were adjusted to give a consistent low end reflectance when the device was powered.

Figure 7:
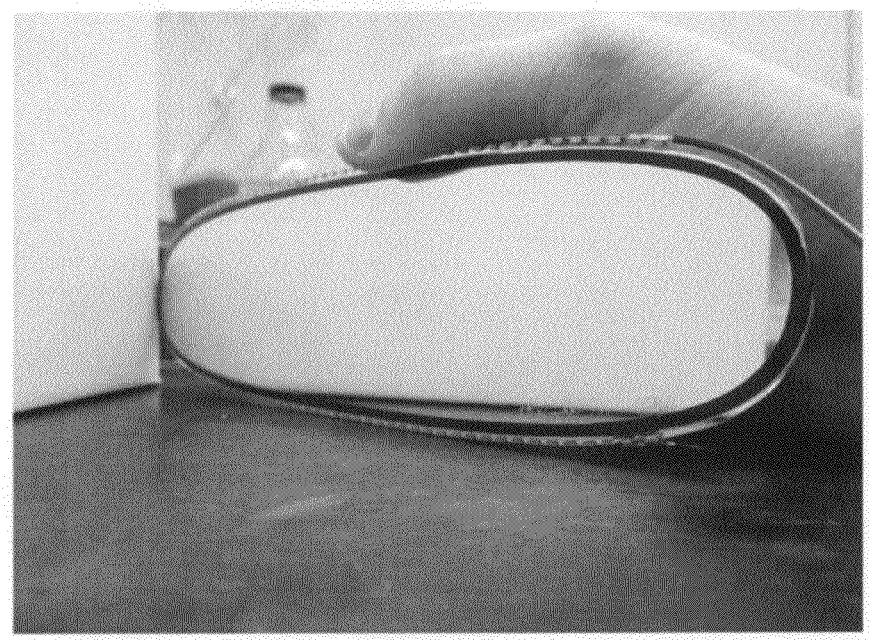
FIG. 7 of the drawings is a color photograph of an electrochromic device fabricated in accordance with Example IV showing the absence of the phenomenon known as segregation.
Figure 8:
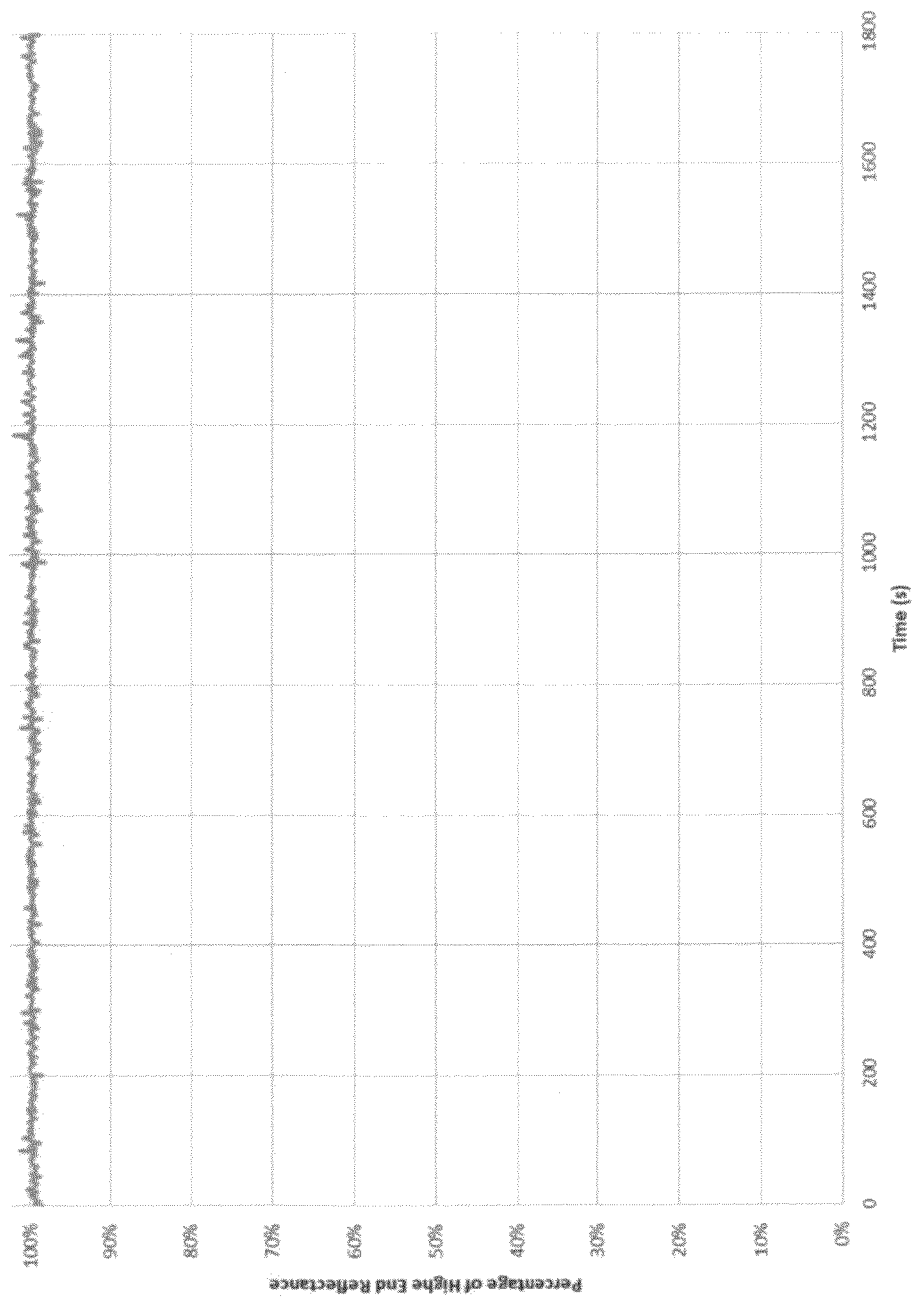
FIG. 8 of the drawings is a two-dimensional plot showing the change in percentage of high end reflectance as a function of time for Example IV.

The devices were placed in a 50° C. oven with an applied potential of 1.2V for 24 hours. The devices were removed from the oven and shorted for approximately ten seconds and placed on a reflectance meter. The reflectance was measured for approximately 1,800 seconds approximately 8 mm from the edge where the cathode is connected to the power source and in the center of the device. The mirror from experiment IV did not exhibit material segregation, which was confirmed since the reflectance did not show any deviation from the device's high end reflectance. See FIGS. 7 and 8. Results from the mirrors of experiments III and IV are provided in FIGS. 3-4 and 5-6, respectively.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed and desired to be secured by Letters Patent of the United States is:

1. A distate interior electrochromic mirror, comprising:
    a first substantially transparent substrate having an electrically conductive material associated therewith;
    a second substrate having an electrically conductive material and an at least partially reflective material associated therewith;
    an electrochromic medium contained within a chamber positioned between the first and second substrates which comprises:
        at least one solvent;
        at least one anodic material;

at least one cathodic material, wherein both of the anodic and cathodic materials are electroactive and at least one of the anodic and cathodic materials is electrochromic;
a cross-linked polymer matrix;
wherein, in a first state, the electrochromic medium exhibits a maximum light transmission; and
wherein, in a second state, attenuation occurs to a significant extent in at least one of visible radiation and near-infrared radiation; and
wherein the distate electrochromic device does not materially exhibit segregation after being maintained in the second state for 24 continuous hours at 50 degrees centigrade.

2. The distate interior electrochromic mirror according to claim 1, wherein, in the second state, attenuation occurs to a significant extent in both visible radiation and near-infrared radiation.

3. The distate interior electrochromic mirror according to claim 1, wherein said mirror does not materially exhibit segregation after being maintained in the second state for 48 continuous hours at 50 degrees centigrade.

4. The distate interior electrochromic mirror according to claim 1, wherein the at least one anodic material comprises a substituted phenazine.

5. The distate interior electrochromic mirror according to claim 1, wherein the at least one cathodic material comprises a viologen.

6. The distate interior electrochromic mirror according to claim 1, wherein the concentration of the at least one anodic material and the at least one cathodic material each ranges from approximately 1 mM to approximately 500 mM.

7. The distate interior electrochromic mirror according to claim 1, wherein the electrochromic medium further comprises at least one of an anodic and cathodic color-stabilizing redox buffer.

8. The distate interior electrochromic mirror according to claim 1, wherein the electrochromic medium further comprises anodic and cathodic color-stabilizing redox buffers.

9. The distate interior electrochromic mirror according to claim 1, wherein the chamber comprises a thickness of at least approximately 150 microns.

10. The distate interior electrochromic mirror according to claim 1, wherein the chamber comprises a thickness of at least approximately 160 microns.

11. The distate interior electrochromic mirror according to claim 1, wherein the chamber comprises a thickness of at least approximately 170 microns.

12. The distate interior electrochromic mirror according to claim 1, wherein the conductivity of the electrically conductive material associated with at least one of the first and second substrates is less than 10 ohms/square.

13. The distate interior electrochromic mirror according to claim 1, wherein the conductivity of the electrically conductive material associated with at least one of the first and second substrates is less than 2 ohms/square.

14. An interior electrochromic mirror, comprising:
a front element having first and second surfaces;
a rear element having third and fourth surfaces;
wherein the front and rear elements are sealably bonded together in a spaced-apart relationship to define a chamber having dimensions such that the width is longer than the height and such that the second surface and the third surface face one another;
a substantially transparent first electrode including a layer of conductive material associated with the second surface and a second electrode including an at least partially reflective material associated with the third surface;
an electrochromic medium contained in the chamber and first and second electrical contacts electrically communicating with a respective one of the first and second electrodes;
wherein the electrochromic mirror is adapted to be in one of a high transmission state and a low transmission state; and
wherein after being maintained in its low transmission state for 24 continuous hours at 50 degrees centigrade, and wherein after the first and second electrodes are shorted to one another, the reflectance of the electrochromic mirror rises above approximately 50 percent of its maximum reflectance in less than 20 seconds, said measurement being taken approximately one centimeter away from an edge where a cathode is connected to a power source of the electrochromic mirror and at a midpoint of the elongated side.

15. The interior electrochromic mirror according to claim 14, wherein the reflectance of said mirror rises above approximately 75 percent of its maximum reflectance in less than 20 seconds.

16. The interior electrochromic mirror according to claim 14, wherein the reflectance of said mirror rises above approximately 90 percent of its maximum reflectance in less than 20 seconds.

17. The interior electrochromic mirror according to claim 14, wherein the reflectance of said mirror rises above approximately 90 percent of its maximum reflectance in less than 10 seconds.

18. An interior electrochromic mirror, comprising:
a front element having first and second surfaces;
a rear element having third and fourth surfaces;
wherein the front and rear elements are sealably bonded together in a spaced-apart relationship to define a chamber having dimensions such that the width is longer than the height, the thickness greater than approximately 150 microns, and such that the second surface and the third surface face one another;
a substantially transparent first electrode including a layer of conductive material associated with the second surface and a second electrode including an at least partially reflective material associated with the third surface;
an electrochromic medium contained in the chamber and first and second electrical contacts electrically communicating with a respective one of the first and second electrodes;
wherein the electrochromic mirror is adapted to be in one of a high transmission state and a low transmission state; and
wherein after being maintained in its low transmission state for 24 continuous hours at 50 degrees centigrade, and wherein after the first and second electrodes are shorted to one another, the reflectance of the electrochromic mirror rises above approximately 50 percent of its maximum reflectance in less than 20 seconds, said measurement being taken approximately one centimeter away from an edge where a cathode is connected to a power source of the electrochromic mirror and at a midpoint of the elongated side.

19. The interior electrochromic mirror according to claim 18, wherein the reflectance of said mirror rises above approximately 75 percent of its maximum reflectance in less than 20 seconds.

20. The interior electrochromic mirror according to claim 18, wherein the reflectance of said mirror rises above approximately 90 percent of its maximum reflectance in less than 10 seconds.

* * * * *